OR 4,030,806

United States
Goshima et al.

[11] 4,030,806

[45] June 21, 1977

[54] SCANNING OPTICAL SYSTEM

[75] Inventors: Takeshi Goshima, Tokyo; Noritaka Mochizuki, Yokohama, both of Japan

[73] Assignee: Canon Kabushiki Kaisha, Tokyo, Japan

[22] Filed: Aug. 25, 1975

[21] Appl. No.: 607,502

[30] Foreign Application Priority Data

Sept. 11, 1974 Japan .............................. 49-104735

[52] U.S. Cl. .................................................. 350/7
[51] Int. Cl.² ...................................... G02B 27/17
[58] Field of Search ................. 350/7, 6, 190, 285; 178/7.6

[56] References Cited
UNITED STATES PATENTS

| | | | |
|---|---|---|---|
| 2,059,221 | 11/1936 | Fessenden | 350/7 |
| 2,961,918 | 11/1960 | Nadig et al. | 350/7 |
| 3,804,485 | 4/1974 | Clarke | 178/7.6 |
| 3,813,140 | 5/1974 | Knockeart | 350/7 |
| 3,865,465 | 2/1975 | Tatuoka et al. | 350/7 |
| 3,897,150 | 7/1975 | Bridges et al. | 178/7.6 |

*Primary Examiner*—John K. Corbin
*Assistant Examiner*—B. W. De Los Reyes

[57] ABSTRACT

A scanning optical system of a type wherein a light beam is sequentially reflected by each of the reflection surfaces of a polygonal mirror rotating in a predetermined direction to convert it to a scanning light beam which moves repetitively in a single direction to scan the surface of an object to be scanned, the optical system being provided with means for moving the light beam incident on the reflection surface in a single direction along the direction of the rotating movement of the reflection surfaces and in a repetitive manner in synchronism with rotation of the polygonal mirror so that the light beam may be constantly projected onto an effective reflection region of each reflection surface of the polygonal mirror.

28 Claims, 7 Drawing Figures

SCANNING OPTICAL SYSTEM

BACKGROUND OF THE INVENTION

1. Field of the Invention

This invention is concerned with a scanning optical system capable of forming a scanning light beam which moves at a high speed and in a broad range by the use of a polygonal mirror rotating in a predetermined direction. More particularly, the invention relates to a scanning optical system having means for providing an extremely low variation in the amount of light of the scanning light beam with rotation of the polygonal mirror.

In various apparatuses such as, for instance, recording devices for printing high speed patterns and character informations from electrical computers, etc., high speed read-out devices from hologram arrays, detection devices for surface defects of an object to be detected, and so forth, there have been great demands for a light beam scanning optical system which is operable at a high speed, compact in its construction, and sufficiently stable and precise in its operations.

2. Description of the Prior Art

A known scanning optical system which causes the light beam to scan on an object to be detected, and which includes a rotary polygonal mirror uses a method for increasing the scanning speed of the light beam in which the rotary polygonal mirror is rotated at a high speed, or another method, in which the number of reflection surface on the rotary polygonal mirror is increased.

However, an increase in the rotational speed of the polygonal mirror would be apprehensively liable to invite increase in frictional resistance with air to necessitate the driving mechanism to exert more power as well as to bring about undesirable noise. Also, this increase in the rotational speed results in unsatisfactory conditions of the device such as, for example, it requires an increased size for the structure, and reduces the stability and preciseness of operations, and so on.

Further, when the number of reflection surfaces of the rotary polygonal mirror is increased without changing the size of the reflection surface itself, the diameter of the rotary polygonal mirror becomes larger with a consequent increase in required power of the driving mechanism, generation of undesirable noise, or lack in compactness in its construction as well as inferior stability and preciseness in its operations.

Furthermore, when the number of the reflection surfaces is increased without changing the diameter of the rotary polygonal mirror, i.e. the area of each constituent reflection surface is reduced, and when a light beam of the same diameter is projected thereonto, there inevitably occurs such disadvantage that the angle of deflection of the light beam, within which the energy quantity of the light beam does not vary, becomes smaller than in the case where the area of the reflection surface remains unchanged. In other words, the period of ineffective scanning operation increases, and the scanning efficiency lowers accordingly. This phenomenon occurs because the ratio of the effective reflection region of a single reflection surface to the total area of the reflection surfaces on the rotary polygonal mirror has become reduced as the result of the relative reduction in area of the single reflection surface in comparison with the largeness in cross-section of the light beam. (The term "effective reflection region" as used herein is meant by the region wherein the light beam projected on one of the reflection surfaces is totally reflected at this particular reflection surface. In case the light beam enters into an edge region of one reflection surface, one part of this incident light beam is also projected onto an adjacent reflection surface and causes a decrease in the required light amount of the scanning light beam. The so-called "eclipse" of the light beam results thereby.)

In the following, explanations will be made as to an improved method of increasing the scanning speed of the light beam in consideration of the abovementioned defects.

A method which can be contemplated at first is one in which the light beam is converged on the reflection surface of the rotary polygonal mirror by the use of a converging optical system, i.e., a method wherein the cross-section of the light beam is reduced in correspondence to the smallness of the reflection surface. This method, however, has such disadvantage that the light beam once converged by the converging optical system is again diverged with the consequence that it assumes a wider cross-section at the position of the object to be scanned. In view of the fact that, in the print-out device for pattern and character informations output from electronic computers, for example, the photosensitive body should be scanned with a light beam in the form of a spot, so that such divergent light beam as mentioned above is of no use for the scanning purpose. If such divergent light beam is to be converged to a spot, a converging lens needs be disposed in the light path for this divergent light beam, whereupon the scanning of the object per se becomes impossible. The reason for this inability is that, since the abovementioned light beam diverges from substantially one point (a point at a position where the reflection surface is present), and, at the same time, moves angularly on this point as the center, the abovementioned converging lens acts to converge the scanning light beam and simultaneously direct the scanning light beam entirely onto the abovementioned single conjugate spot with respect to the converging lens.

Also, there can be contemplated another method, wherein sufficiently thin parallel light beams are projected onto the surface of the rotary polygonal mirror where the scanning light beam is reflected. In this method, however, as the resolution of the scanning optical system (i.e., number of resolving point on the surface to be scanned) is determined by a product of a diameter of the incident light beam onto the abovementioned reflection surface and a range of angle, within which the light beam moves angularly, after it is reflected, the diameter of the incident light beam is naturally limited, so that it is not feasible to make the diameter of the incident light beam excessively thin.

In the Japanese Patent Publication No. 49-16824 (published Aug. 16, 1969), there is disclosed a method for removing the abovementioned inconvenience when the area of the reflection surface of the rotary polygonal mirror is reduced. According to this method, the light beam is made to be projected onto the reflection surface of the rotary polygonal mirror by vibrating the light beam with a sinusoidal wave, saw-tooth wave, or the like wave forms in synchronism with rotation of this rotary polygonal mirror. Although this method successfully prevents a part of the light beam from projecting into adjacent reflection surface during a single required scanning period, it still is not free from the defect such that as the light beam reciprocatingly vibrates, there inevitably occurs an idle period for the scanning operation. That is, even when the subsequent reflection surface of the polygonal mirror arrives at the reflecting position to enable the light beam to move for the scanning upon completion of one scanning period, the required scanning operation can not be performed during the time instant in which the incident light beam is caused to return to the starting position, and it is virtually impossible to reduce this idle period. In order to shorten this idle period, the speed for the return motion of the abovementioned light beam should be made quicker than the speed for the advancing motion thereof. For this purpose, however, it is mandatory to utilize a superprecise vibrating optical system having a remarkably high responsive capability such as a sawtooth vibrating mirror having an extremely sharp trailing characteristic.

Consequently, when the abovementioned method is applied in carrying out an efficient and high speed scanning operation, the performance of the abovementioned vibrating optical system makes it difficult to sufficiently shorten the idle period for the scanning.

SUMMARY OF THE INVENTION

It is therefore an object of the present invention to provide a scanning optical system having satisfactory scanning efficiency, in which a rotary polygonal mirror is used.

It is another object of the present invention to provide a scannning optical system which utilizes the abovementioned rotary polygonal mirror and which is capable of reducing to a minimum the existence of the idle period owing to the reciprocating scanning motion of the light beam on the reflection surface of the rotary polygonal mirror as described above.

It is still another object of the present invention to provide a scanning optical system using the rotary polygonal mirror and having satisfactory scanning efficiency, in which the existence of the abovementioned idle period for the scanning operation can be removed, and the scanning light beam in the form of a converged spot can be formed on the surface to be scanned.

It is other object of the present invention to provide a scanning optical system using the rotary polygonal mirror, which enables the area of each reflection surface of the rotary polygonal mirror to be smaller, and the desired high speed scanning to be easily realized with high scanning efficiency.

It is still other object of the present invention to provide a scanning optical system utilizing the rotary polygonal mirror and being excellent in its resolution.

The foregoing objects and other objects as well as detailed constructions and operations of the scanning optical device according to the present invention will become more apparent and understandable from the following precise description thereof when read in conjunction with the accompanying drawings.

DESCRIPTION OF THE PREFERRED EMBODIMENTS

The scanning optical system according to the present invention is provided with means to cause a light beam from a light source for being projected upon a reflection surface of a rotary polygonal mirror rotating in a predetermined direction, and being reflected by the reflection surface so as to scan a surface of an object to be scanned to move repetitively in a single definite direction along the moving direction of the reflection surface in synchronism with rotation of the polygonal mirror so that this light beam may be constantly projected onto an effective reflection area of the reflection surface. What is meant by the unidirectional and repetitive movement of the light beam is that, after the light beam continuously moves from a starting point to a terminal point, it immediately starts its movement from the initial starting point, and not the reverse movement along the locus or path of the advancing movement from the terminal point back to the starting point. One example of the optical system, in which the light beam is caused to move repetitively in the single direction, is a rotary polygonal mirror. In a preferred embodiment of the scanning optical system according to the present invention, such unidirectionally and repetitively moving light beam which is projected onto the reflection surface of the abovementioned polygonal mirror to reflect such scanning light beam is formed by the use of a subordinate polygonal mirror. Thus, in view of the fact that the unidirectionally and repetitively moving light beam is projected onto the reflection surface of the polygonal mirror, even if this light beam is thick to improve the resolution of the optical system, the eclipse or shading of the incident light beam at the edge line portion of the two reflection surfaces can be avoided, and the idle period in the scanning operation can be removed, whereby efficient and high speed scanning becomes feasible.

Figure 1:
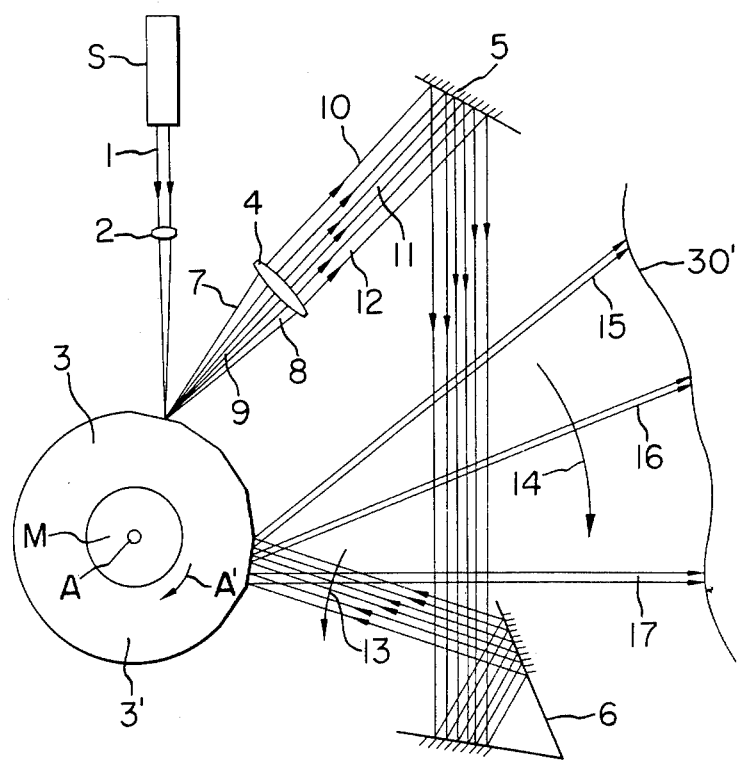
FIG. 1 is a schematic explanatory diagram showing one embodiment of the scanning optical system according to the present invention.

Referring now to FIG. 1 which shows one embodiment of the scanning optical system according to the present invention, the device consists of two sub-systems. The first sub-system forms a light beam which moves repetitively in a single direction, and the second sub-system reflects the light beam from the first sub-system to cause the same to scan an object.

The first sub-system consists of a converging optical system 2 which converges a light beam 1 such as laser light to be emitted from a source of light S (this light ray may also be any one that can fall within the wavelength region of any of infrared rays, visible light rays, or ultra-violet rays.) onto a focal point or an image forming point in the form of a spot or a thin line; a first rotary polygonal mirror 3 having a plurality of reflection surfaces, on each of which the abovementioned focal point or image forming point is established, for being rotated by a motor M with the axis A as the center of its rotation (in the drawing figure, not all the reflection surfaces around the polygonal mirror are shown, but only a part thereof; in the actual construction, the reflection mirrors should surround the entire periphery of the polygonal body to constitute the polygonal mirror); a collimation optical system 4 which converts angularly moving light beams diverged from the rotary polygonal mirror 3 into parallel moving light beams (the focal point of the collimation optical system being on the reflection surface, onto which the light beam 1 from the polygonal mirror 3 is projected); a reflection mirror 5 to change the travelling direction of the light beam from the collimation optical system 4; and two mirrors 6 set in a mutually angular relationship and opposite to the reflection mirror 5. The reference numerals 7, 8 and 9 in the drawing indicate, respectively, the right edge, center part, and left edge, of the light beams which are obtained by rotation of the first rotary polygonal mirror 3 and move angularly and repetitively in a single direction within the range of deflection as viewed from the direction of the collimation optical system 4. The arrow mark A' indicates the rotational direction of the rotary polygonal mirror.

As the first sub-system is constructed as stated above, the light beam 1 from the light source S is converged onto one of the reflection mirrors of the first rotary polygonal mirror 3 by means of the converging optical system 2. By the rotation of the first rotary polygonal mirror 3, the reflection surface changes its inclination. Then, as the first rotary polygonal mirror 3 rotates, the reflection surface, on which the converged light beam is projected, moves away, and a subsequent reflection surface comes to the position where the light beam 1 reaches. Consequently, the light beam 1 is reflected with a certain deflection angle, and moves angularly and repetitively in a single direction. The thus reflected light beams 7, 8 and 9 are rendered parallel light beams 10, 11 and 12 respectively by the collimating optical system 4. Incidentally, the optical systems 2 and 4 also serve to function as the beam expander. These parallel light beams 10, 11 and 12 are then directed to the second sub-system by means of the reflection mirrors 5 and 6. An arrow mark 13 indicates the moving direction of the light beams 10, 11 and 12.

The second sub-system is principally constructed with a second rotary polygonal mirror. It is desirable that this second rotary polygonal mirror rotate in synchronism with rotation of the first rotary polygonal mirror 3. Accordingly, there must be provided a synchronizing mechanism in the driving means for the first and second rotary polygonal mirrors for establishing the required synchronism therebetween. However, to dispense with this requirement for a synchronizing mechanism, the embodiment of the present invention shown in this FIG. 1 utilizes the first rotary polygonal mirror 3 in common with the second polygonal mirror. Therefore, in this drawing figure, the second rotary polygonal mirror will hereinafter be indicated with a reference numeral 3'.

The unidirectionally and repetitively moving parallel light beams 10, 11 and 12 from the first sub-system are deflected by the reflection mirror system 5 and 6, and projected onto the reflection surface of the second rotary polygonal mirror 3'. When the deflection angle and the light path for the parallel light beams by the reflection mirror systems 5 and 6 are established as shown in FIG. 1, the parallel light beams 10, 11 and 12 move in parallel along the rotational direction A' of the second rotary polygonal mirror 3' as shown in the drawing, on account of which the light beams 10, 11 and 12, even when the rotary polygonal mirror 3' rotates, are constantly projected onto a substantially single spot on the reflection surface such as, for example, an effective reflection region like the center part of the reflection surface. These incident parallel light beams 10, 11 and 12 are then turned to scanning light beams 15, 16 and 17 which are produced by being reflected at their respective points of incidence shown with an arrow mark 14 and move angularly and repetitively in a single direction. The light beams 15, 16 and 17 scan the surface 30' of an object to be scanned.

Figure 2:
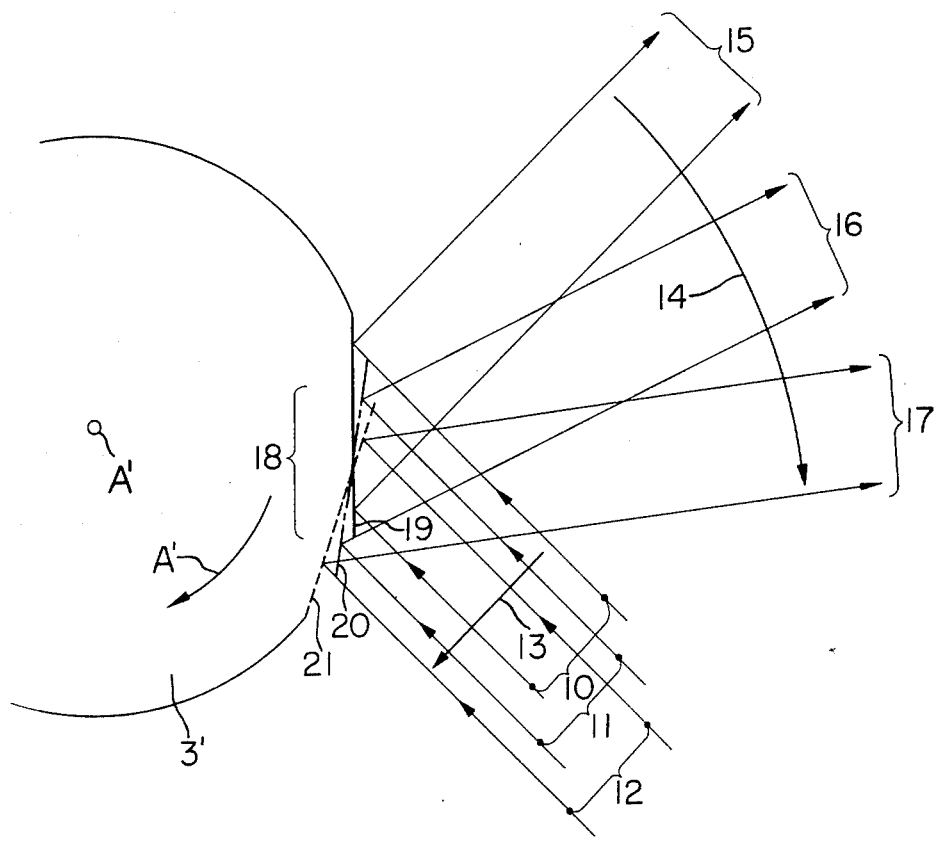
FIG. 2 is a view for explaining in detail the reflective conditions of a light beam at a polygonal mirror used in the embodiment shown in FIG. 1.

The abovementioned conditions of reflection and scanning are shown in more detail in FIG. 2, wherein a reference numeral 18 designates one of the reflection surfaces of the second rotary polygonal mirror 3', and 19, 20 and 21 respectively indicate inclination of the reflection surface when the second rotary polygonal mirror 3' rotates in the arrowed direction. When the reflection surface is at the position 19, the parallel light beam 10 is projected onto the reflection surface. In the same manner, when the reflection surface 18 is at the position 20, the parallel light beam 11 is projected, and, when it is at the position 21, the parallel light beam 12 is projected thereon. As is apparent from the drawing, even when the reflection surface moves, the light beams 10, 11 and 12 are constantly projected onto a substantially definite position on the reflection surface, so that no part of the incident light beam is projected onto other reflection surfaces adjacent to the reflection surface 18, hence no shading or eclipse takes place. In other words, it is always possible to project the light beam onto the effective reflection region of the reflection surface. On account of this, the scanning light beams 15, 16 and 17 are always in a constant energy amount, and can be projected onto the reflection surface 18 with a thick beam diameter. Consequently, in comparison with a case where the light beam incident on the second rotary polygonal mirror 3' is stationary in space, the scanning region, where the energy amount of the scanning light beam does not change, becomes broadened. In further comparison with the scanning region of the first sub-system, the scanning region in this second sub-system is also broadened. Moreover, as the light beam incident on the second rotary polygonal mirror 3' is a unidirectionally and repetitively moving light beam in the direction 13 along the rotational direction A' of the rotary polygonal mirror, there is no idle period in the scanning operation as mentioned in the foregoing. In this particular embodiment, the light beams from the first rotary polygonal mirror 3 in the first sub-system are rendered parallel ' y means of the collimating optical system. However, same result can be obtained, even if the light beams 7, 8 and 9 from the first rotary polygonal mirror 3 are directly projected onto the reflection surface of the second rotary polygonal mirror 3' of the second sub-system. Also, when the first and second rotary polygonal mirrors 3, 3' are made common, the light beam 1 from the light source S, and the light beams 10, 11, and 12 from the first sub-system may be projected onto one end and the same reflection surface by means of reflection means.

In the embodiment shown in FIG. 1, the surface 30' of an object is directly scanned with parallel light beams which are reflected by the second rotary polygonal mirror and move angularly and repetitively in a single direction. In this case, the scanning speed of the light beam varies at both edges and at center part of the scanning region. Also, the diameter of the scanning light beam incident on the surface 31 to be scanned is fairly thick or large.

Figure 3:
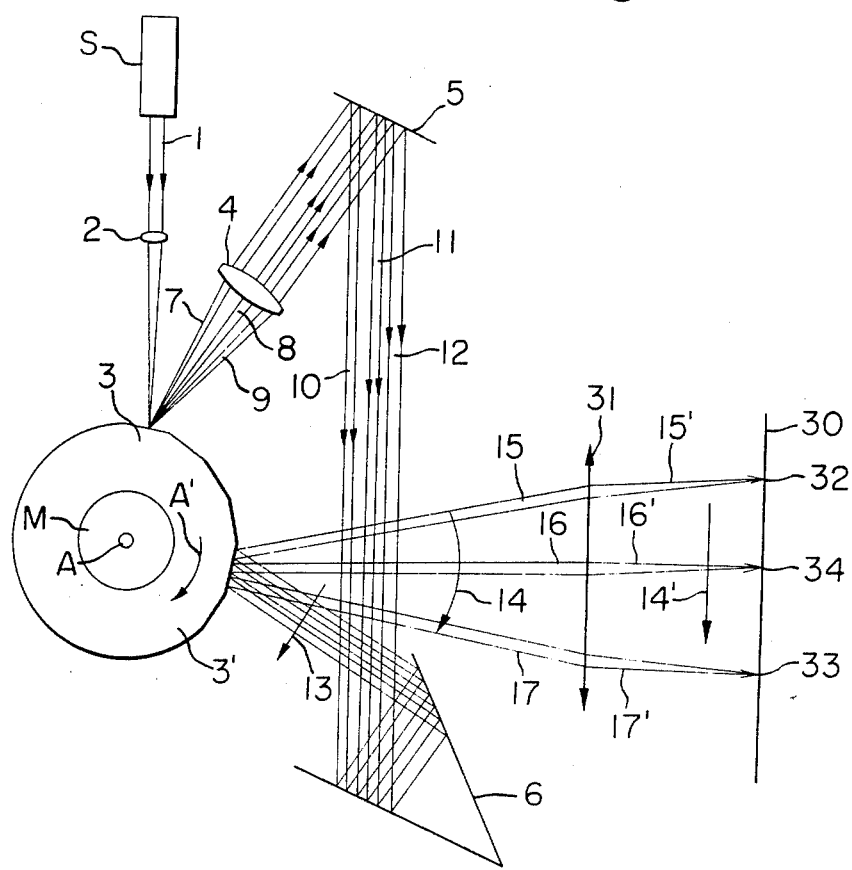
FIG. 3 is also a schematic explanatory diagram showing another embodiment of the scanning optical system according to the present invention.

In another embodiment of the scanning optical system shown in FIG. 3, there is disposed in the light path between the second rotary polygonal mirror 3' and the surface 30 of the object to be scanned an image forming or focussing optical system 31 which converges the light beams 15, 16 and 17 and causes them to be projected onto the surface to be scanned in the form of a spot. In the case of the embodiment shown in FIG. 3, the image forming optical system 31 is so disposed that its focal point may substantially coincide with the reflection surface of the second rotary polygonal mirror 3' where the scanning light beam is reflected, and the surface 30 of an object to be scanned. Accordingly, the parallel light beams 15, 16 and 17 which move angularly by this optical system 31 is converted to the converged light beams 15', 16' and 17', and, at the same time, these converged light beams 15', 16' and 17' become mutually parallel light beams which move repetitively in a single direction as shown by an arrow 14'. However, when the image forming optical system 31 consists of an ordinary lens, the moving speed of the light beams 15', 16' and 17' is not constant. That is to say, the light beams 15' and 17' at both ends of the scanning region are fast, while the light beam 16' in the center part of the scanning region is slow. Accordingly, for the image forming optical system 31, it is desirable that an $f\cdot\theta$ lens be utilized. (The $f\cdot\theta$ lens is such one that, when an object is at an infinite distance, its image height is represented by $Q' = f\theta$, where $\theta$ is a picture angle of the lens. In an ordinary lens, the image height is represented by $Y' = f\tan\theta$.) thus, when the $f\cdot\theta$ lens is used for the image forming optical system 31, the moving speeds of the light beams 15', 16' and 17' on the surface of an object to be scanned become substantially equal each to other.

In the embodiments shown in FIGS. 1 and 3, are made in such a way that the light beam 1 from the light source S may be converged on the reflection surface of the first rotary polygonal mirror. Strictly speaking, however, the converging point is not aways on the reflection surface. This will be explained in detail hereinbelow with reference to FIG. 4.

Figure 4:
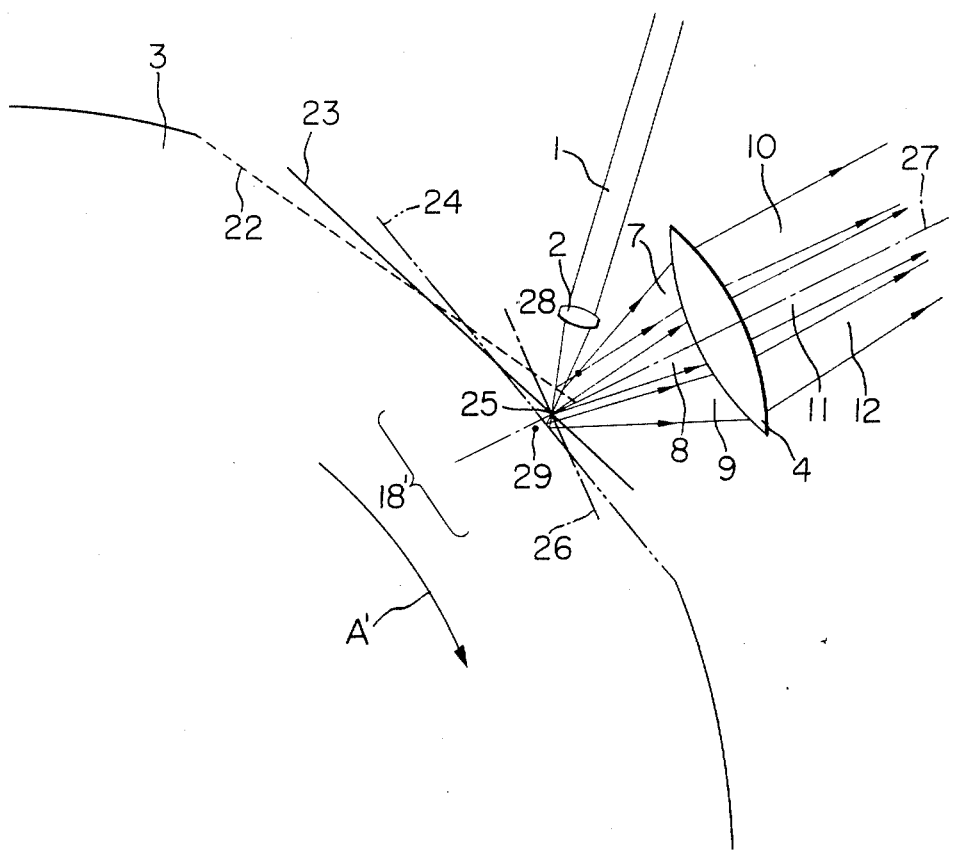
FIG. 4 is a view for explaining in detail the reflective conditions of converging light beam at the polygonal mirror used in the embodiments shown in FIGS. 1 and 3.

In FIG. 4, reference numerals 22, 23 and 24 respectively indicate positions where one reflections surface 18' reaches, when the first rotary polygonal mirror 3 rotates in the direction of the arrow mark A'. Now assume that the converging point of the light beam 1 by means of the lens 2 is on the reflection surface which has arrived at the position 23, the point of convergence of which is indicated by 25. This point of convergence 25 is also assumed to be on the focal plane 26 of the lens 4 as well as on the optical axis 27. After the light beam 1 is reflected by the reflection surface at the position 22, it is converged on the point 28 which corresponds to the position 25 of the mirror surface with respect to the position 22. On the other hand, the light beam 1 reflected by the reflection surface at the position 24 is converged before it is reflected, and the reflected light beam 9 becomes equal to the light beam diverged from the point 29 which corresponds to the position 25 of the mirror surface with respect to the position 24. These points of convergence 28 and 29 (the point 29 being the imaginary point of convergence) are not on the focal plane 26 of the lens 4, but are positioned off the optical axis 27. On account of this, the light beam 8 directing from the converging point 25 to the lens 4 will be emitted from the lens 4 in the form of a parallel light beam and in parallel with the optical axis 27 of the lens 4 (light beam 11). On the other hand, however, the light beam directing from the points of convergence 28 and 29 to the lens 4 will be emitted from the lens 4 in the form of a diverging light beam 10 or in the form of a converging light beam 12, and in the state of not being in parallel with the optical axis 27. Thus, the light beam to be emitted from the reflection surface of the first rotary polygonal mirror 3 is not emitted from the same point, but from respectively different points. On account of this, the actual light beam is different from the light beam which is considered to have been emitted from the same point on the reflection surface of the rotary polygonal mirror in respect of its direction of emission as well as degree fo parallelism of the light beam per se.

Owing to the abovementioned phenomenon, even when the $f\cdot\theta$ lens 31 is used for the optical system of the first embodiment to further make the speed of the scanning light beam constant at the scanning surface 30, the defects as will be mentioned hereinbelow with reference to FIG. 5 will inevitably arise.

Figure 5:
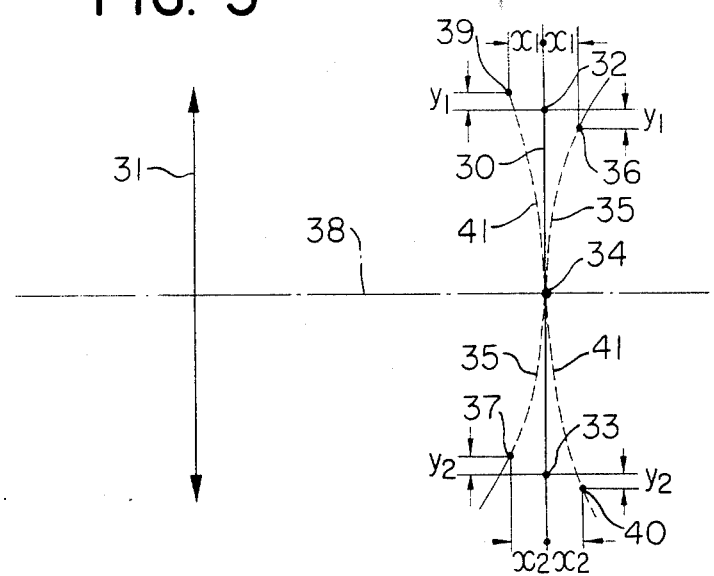
FIG. 5 is an explanatory view for a preferred $f\cdot\theta$ lens for use in a converging optical system in FIG. 4.

FIG. 5 shows an image forming point of the scanning light beam in the vicinity of the $f\cdot\theta$ lens 31 and its focal plane 30 (the surface of an object to be scanned). If it is assumed that the light beam 1 is always reflected at the same point 25 on the reflection surface 18' in FIG. 4, the scanning light beam 15', 16' and 17' (FIG. 3) is converged at the points 32, 34 and 33, respectively on the focal plane 30 of the $f\cdot\theta$ lens. In reality, however, the light beam 1 is not reflected only at the same point on the reflection surface 18', but it diverges from different points 28, 25 and 29. Accordingly, the light beam 15' from the point 28 is converged on the point 36 on the curve 35 in FIG. 5, and the light beam 17' from the point 29 is also converged on the point 37 on the same curve 35. Incidentally, the curve 35 is a locus of the points of convergence of the light beam. On the other hand, the points 36 and 37 are respectively displaced from the points 32 and 33 for the co-ordinate of $(+x_1, -y_1)$, $(-x_2, -y_2)$ with respect to the direction of the optical axis 38 and the direction perpendicular to the optical axis 38, respectively. That is, when an ideal $f\cdot\theta$ lens is used for the scanning optical system shown in FIG. 3, the lens should eventually have a distortional aberration represented by $-y_1$, $-y_2$, and a de-focus represented by $+x_1, -x_2$ with respect to the point on the focal surface 30. Accordingly, when an extremely precise scanning operation is required, it is desirable that a lens having the de-focus and the distortional aberration as indicated by the curve 41 may be used as the $f\cdot\theta$ lens for the purpose of the embodiment shown in FIG. 3, provided that it is used for the ideal image forming system thereof. The curve 41 is a locus of the points of convergence of the light beams.) That is to say, when this lens is to be used for the ideal image forming system, it is desirable to use a compensating $f\cdot\theta$ lens, wherein the light beam that converges on the point 36 may converge on the point 39, and the light beam that converges on the point 37 may converge on the point 40, provided that the points 39 and 40 are respectively in symmetrical positions with the points 36 and 37 in the co-ordinate in respect of the points 32 and 33. When such compensating $f\cdot\theta$ lens is used for the optical system 31 in FIG. 3, the light beams 15', 16' and 17' converge on the same plane (i.e., on the surface 30 of an object to be scanned), where they scan at a constant speed without the resultant defocussing and distortional aberration. The thus compensated $f\cdot\theta$ lens as mentioned above has an asymmetrical configuration with respect to the optical axis, which requires high skill in its manufacturing.

A compensating $f\cdot\theta$ lens which can be manufactured more easily is as follows. The compensating $f\cdot\theta$ lens coincides its optical axis with the axis of the light beam that passes through the outermost end of the scanning region within the maximum scanning angle of the light beam, e.g., the light beam 15, and is so arranged that the light beam 15' may be converged on this optical axis. If the lens arranged as such is the ideal $f\cdot\theta$ lens, the points of convergence 32, 34 and 33 of the light beams 15', 16' and 17' respectively intersect the surface 30 of the object to be scanned at the point 32, the intersection of which will be on the arcuate locus present at the left side of this surface to be scanned. Accordingly, this compensating $f\cdot\theta$ lens may have a de-focussing and distortional aberration as compared to the ideal $f\cdot\theta$ lens in the ideal image forming system, so that the light beam may be converged on the locus which is symmetrical with the abovementioned locus with respect to the surface 30 to be scanned. While such compensating lens is easier in its manufacturing than the abovementioned compensating lens which is asymmetrical with the optical axis, it has a disadvantage in that it can be used only on one side of the lens.

On the other hand, when the optical system according to the present invention is applied to the print-out of an output from electronic computer, the resultant distortional aberration and de-focussing of the $f\cdot\theta$ lens as shown in FIG. 5 do not constitute large practical defects, hence satisfactory results can be obtained even if such non-compensated $f\cdot\theta$ lens as mentioned above is utilized.

Figure 6:
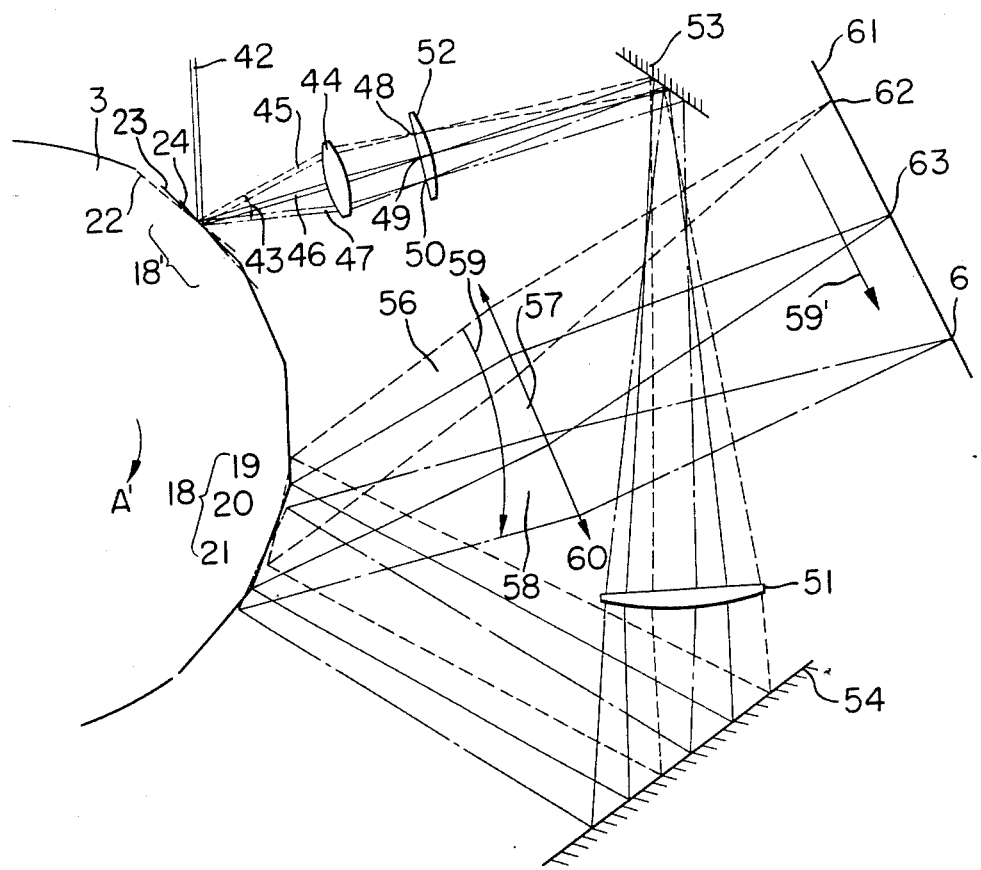
FIG. 6 is a schematic explanatory diagram showing still another embodiment of the scanning optical system according to the present invention.

FIG. 6 is for explaining the third embodiment of the present invention. In this drawing figure, there is also shown a rotary polygonal mirror 3 which is rotated by a motor M with the axis A (not shown) as the center of rotation as in FIGS. 1 and 3. Reference numerals 22, 23 and 24 indicate positions to be taken by one reflection surface of the rotary polygonal mirror 3 (this will hereinafter be referred to as "first reflection surface 18'") following rotation of the rotary polygonal mirror 3. A parallel light beam 42, which is sufficiently thin to an extent that, even if it is eclipsed at the end part of the reflection surface 18', such eclipse can be subsided within a time period that is permissible for the purpose of the scanning operation, is projected on the first reflection surface 18', the light beam 42 is reflected in accordance with the varying positions 22, 23 and 24 of the first reflection surface 18'. The thus reflected light beam moves repetitively in one direction within a range of angle shown by the reference numeral 43 so as to be directed to the lens 44, the focal point of which is substantially on the reflection surface 18'. The reference numerals 45 and 47 respectively indicate both end parts of the range of the repetitive movement, and 46 the light beam at the center part of the range.

These light beams 45, 46 and 47 are converged in the focal plane thereof by the lens 44 to form respective spots 48, 49 and 50. Within this focal plane, there is provided a field lens 52 which causes the pupil of the lens 44 to be image-formed on the pupil of the lens 51. The divergent light from the points of convergence 48, 49 and 50 is directed to the lens 51 through the field lens 52 and a flat mirror 53. The focal plane of the lens 51 is so arranged that it may be on the focal plane of the lens 44. Therefore, the light beams 45, 46 and 47, upon passage through the lens 51, are converted to parallel light beams, and are projected upon the second reflection surface 18, which is different from the above-mentioned first mirror surface of the rotary polygonal mirror 3, through the flat mirror 54. The diameter of the light beam from the lens 51 can be varied by changing the focal length of the lens.

Reference numerals 19, 20 and 21 respectively indicate the positions which the second reflection surface 18 takes in accordance with rotation of the rotary polygonal mirror 65. These positions 19, 20 and 21 for the second reflection surface respectively correspond to the positions 22, 23 and 24 to be taken by the first reflection surface.

The points of convergence 48, 49 and 50 formed by the convergence of the light beams 45, 46 and 47 through the lens 44 within its focal plane are respectively positioned on different locations on the focal plane, and the spots 50, 49 and 48 are arranged in the direction along the rotational direction A' of the rotary polygonal mirror 3. On account of this, the light beams 45, 46 and 47 diverge from the respective points of convergence 48, 49 and 50 on the focal plane, are emitted from the lens 51, through the lens 52 and the reflection mirror 53, in the form of parallel light beams having a large diameter, and are projected onto the reflection mirror 54, so that the incident angle of the light beams 45, 46 and 47 with respect to the normal of the mirror 54 becomes smaller in the sequence of the light beams 45, 46 and 47. Also, the direction where the position of the light beams 45, 46 and 47 to enter into the mirror 54 are arranged along the moving direction of the second reflection surface 18. On account of this, the light beams 45, 46 and 47, after they are reflected by the reflection mirror 54, are projected onto the substantially same positions of the second reflection surface 18, positions 19, 20 and 21, from which they are emitted in the form of the light beams 56, 57 and 58. In this consequence, there takes place no shading phenomenon by the edge of the second reflection surface. It is for increasing the resolution of the scanning optical system that the light beam of a thick diameter is projected onto the second reflection surface 18, and, upon reflection thereat, is directed to an object to be scanned. A reference numeral 59 in FIG. 6 denotes a range of scanning angle of the light beams which move repetitively in a single direction.

In addition to inclination of the reflection surface followed by rotation of the rotary polygonal mirror 3, the light beams which move repetitively in a single direction within the range of the scanning angle 59 are affected by an undesirable angle due to their being emitted from various points on the focal plane of the lens 44. On account of this, it is desirable that the $f\cdot\theta$ lens 60 be compensated so as to be free from the influence of the undesirable angle with respect to the light beams emitted from the lens 60.

The light beams 56, 57 and 58 reflected by the second reflection surface 18 are focussed on the focal plane 61 of the $f\cdot\theta$ lens 60 (the focal plane being coincided with the surface of the object to be scanned) to form respective spots 62, 63 and 64 so as to scan the overall focal plane 61 in the direction shown by the arrow 59'.

Figure 7:
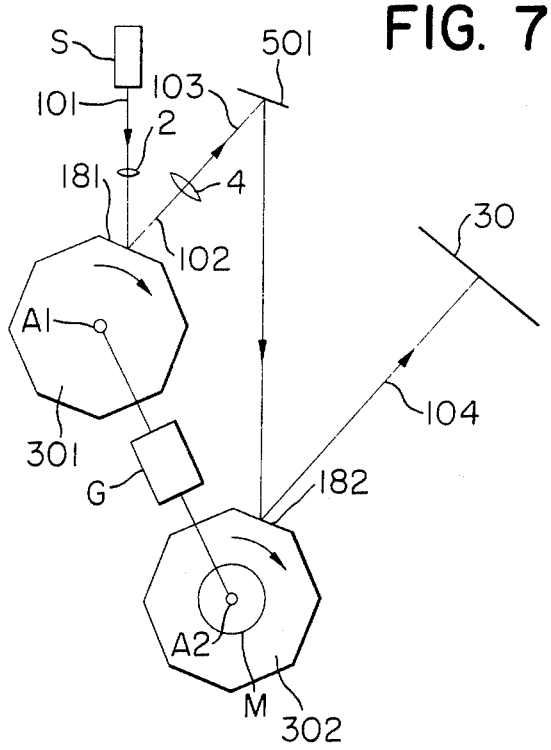
FIG. 7 is also a schematic explanatory diagram showing other embodiment of the scanning optical system according to the present invention.

In the embodiment described hereinabove, the first and second rotary polygonal mirrors are unitary and common. However, they may also be provided separately as shown in FIG. 7. In FIG. 7 the second polygonal mirror 302 is rotated by the motor M on the rotational axis A2, and the first polygonal mirror 301 is also rotated on the rotational axis A1 in the same direction as the second polygonal mirror 302 in synchronism therewith through a mechanical means G consisting of gears for transmitting the rotation. Since the first and second polygonal mirrors have the same number of reflection surfaces, they are rotated at the same angular speed. In case the number of reflection surfaces on both polygonal mirros is different, the gear ratio of the gear mechanism in the transmission means G is adjusted so that the ratio of the angular speed between the two polygonal mirrors may be equal to the reciprocal ratio of the number of the reflection surfaces.

Light beam 101 from a light source S is converged on the reflection surface 181 of the first rotary polygonal mirror 301 by means of a converging lens 2, is then converted to a light beam 102 which moves angularly and repetitively in a single direction, and is directed to a collimator lens 4 whose focal point is substantially on the reflection surface 181. The collimator lens 4 functions to convert the light beam 102 from the reflection surface 181 into a parallel light beam 103 which also moves repetitively in a single direction. The light beam 103 is reflected by a reflection mirror 501 and is projected onto the reflection surface 182 of the second rotary polygonal mirror 302, while moving in parallel with the direction along the rotary movement of this reflection surface. The second rotary polygonal mirror 302 converts the light beam 103 into a scanning light beam 104 which moves angularly and repetitively in a single direction. The light beam 104 scans a surface of an object to be scanned. It may also be feasible that the image forming opitcal system is disposed in the light path of the light beam 104 as shown in FIG. 2, and the light beam 104 is converged on the surface to be scanned.

In FIG. 7, the light beam from the first rotary polygonal mirror is reflected by the reflection mirror 501, and is directed to the second rotary polygonal mirror 302. And, it is also possible to direct this light beam straightforwardly from the first rotary polygonal mirror to the second rotary polygonal mirror. In this case, the gear ratio of the transmission means G may be so adjusted that rotational direction of the two polygonal mirrors 301 and 302 become mutually opposite.

Although the present invention has been described in detail hereinabove with reference to preferred embodiments thereof, it should be noted that these specific embodiments are exemplary and not restrictive, so that changes and modifications may be made by those skilled in the art without deviating from the spirit and scope of the present invention as defined in the appended claims.

What is claimed is:

1. A scanning optical system for moving a light beam to cause it to scan an object, which comprises in combination:
    a. a source of light for emitting a light beam;
    b. first polygonal mirror means having a plurality of reflection surfaces optically disposed in confrontation to said light source, and rotating in a predetermined direction;
    c. a converging optical system disposed to converge the light beam from said light source on the reflection surfaces of said first polygonal mirror means;
    d. a collimating optical system disposed in a light path for a diverging light beam which moves angularly and repetitively in a single direction and which results from said converged light beam being reflected at said first polygonal mirror means, said system converting said diverging light beam into a unidirectionally and repetitively moving parallel light beam; and
    e. second rotary polygonal mirror means having a plurality of reflection surfaces optically disposed in confrontation to said collimating optical system, wherein said second mirror means rotates at the same speed and in synchronism with rotation of said first polygonal mirror means along the moving direction of said light beam; and reflects said parallel light beam formed by said collimating optical system so as to cause it to scan the object.

2. The scannning optical system as claimed in claim 1, further comprising an image forming optical system, disposed in the light path for a parallel light beam reflected at said second polygonal mirror means, for converging the reflected parallel light beam substantially into spot form on the object to be scanned.

3. The scanning optical system as claimed in claim 2, wherein said image forming optical system consists of an $f\cdot\theta$ lens.

4. The scanning optical system as claimed in claim 1, wherein said second light beam moves angularly, and further comprising an optical system to cause the second light beam to move repetitively and substantially parallel in a single direction.

5. The scanning optical system as claimed in claim 1, further comprising an image forming optical system disposed to convert the light beam reflected by said second polygonal mirror means into a converged light beam.

6. The scanning optical system as claimed in claim 5, wherein said image forming optical system comprises an $f\cdot\theta$ lens.

7. The scanning optical system as claimed in claim 1, wherein said first and second polygonal mirror means comprise a single, unitary, rotating polygonal mirror.

8. A scanning optical system for moving a light beam to cause it to scan an object, which comprises in combination;
    a. a source of light for emitting a light beam;
    b. first polygonal mirror means having a plurality of reflection surfaces optically disposed in confrontation to said light source, and rotating in a predetermined direction for forming a first unidirectionally and repetitively moving light beam by reflecting the light beam from said light source;
    c. second polygonal mirror means having a plurality of reflection surfaces optically disposed in confrontation to the repetitively moving light beam and rotating at the same speed and in synchronism with rotation of said first polygonal mirror means along the moving direction of the light beam, and forming a second unidirectionally and repetitively moving light beam to scan the object by reflecting said first unidirectionally and repetitively moving light beam; and d. a light beam diameter changing system disposed in the light path between said light source and said second polygonal mirror means to expand the diameter of the incident light beam projected onto said second polygonal mirror means larger than the diameter of the incident light beam projected onto said first polygonal mirror means.

9. The scanning optical system as claimed in claim 8, wherein said changing optical system is provided with a converging optical system disposed in the light path between said light source and said first polygonal mirror means, and a collimating optical system disposed between said first and second polygonal mirror means.

10. The scanning optical system as claimed in claim 8, wherein said beam changing optical system is provided with a converging optical system and a collimating optical system, both being disposed in the light path between said first and second polygonal mirror means.

11. The scanning optical system as claimed in claim 10, wherein the light beam incident on said first polygonal mirror means from said light source is a parallel light beam.

12. The scanning optical system as claimed in claim 8, further comprising an image forming optical system disposed in the light path for said second unidirectionally and repetitively moving light beam to converge the same.

13. The scanning optical system as claimed in claim 12, wherein said image forming optical system is an $f\cdot\theta$ lens.

14. The scanning optical system as claimed in claim 8, wherein said first and second polygonal mirror means comprise a single, unitary rotating polygonal mirror.

15. A scanning optical system for moving a light beam to cause it to scan an object, which comprises in combination:
a source of light for emitting a light beam;
a polygonal mirror having a plurality of reflection surfaces optically disposed in confrontation to said light source, said mirror rotating in a predetermined direction, and forming a first unidirectionally and repetitively moving light beam by reflecting the light beam from said light source at each of the reflection surfaces in a sequential manner;
reflection means optically disposed in confrontation to said polygonal mirror, and to reflect said first unidirectionally and repetitively moving light beam onto said polygonal mirror, each reflection surface of said polygonal mirror sequentially reflecting said first unidirectionally and repetitively moving light beam to form a second unidirectionally and repetitively moving light beam to scan the object; and
a light beam diameter changing system disposed between the light source and the scanned object and including a collimating optical system to convert the angularly moving light beam into a substantially parallel moving light beam, said collimating optical system being disposed in the light path for said first unidirectionally and repetitively moving light beam.

16. A scanning optical system for moving a light beam to cause it to scan an object, which comprises in combination:
a source of light for emitting a light beam;
a polygonal mirror having a plurality of reflection surfaces optically disposed in confrontation to said light source, said mirror rotating in a predetermined direction, and forming a first unidirectionally and repetitively moving light beam by reflecting the light beam from said light source at each of the reflection surfaces in a sequential manner;
reflection means optically disposed in confrontation to said polygonal mirror, and to reflect said first unidirectionally and repetitively moving light beam onto said polygonal mirror, each reflection surface of said polygonal mirror sequentially reflecting said first unidirectionally and repetitively moving light beam to form a second unidirectionally and repetitively moving light beam to scan the object, wherein said second light beam is an angularly moving light beam, and further comprising an optical system for converting said second light beam into a substantially parallel-moving light beam; and
a light beam diameter changing system disposed between the light source and the scanned object.

17. A scanning optical system for moving a light beam to cause it to scan an object, which comprises, in combination:
a. a source of light for emitting a light beam;
b. a polygonal mirror having a plurality of reflection surfaces optically disposed in confrontation to said light source, rotating in a predetermined direction, and forming a first unidirectionally and repetitively moving light beam by reflecting the light beam from said light source;
c. reflection means optically disposed in confrontation to said polygonal mirror and to cause said first unidirectionally and repetitively moving light beam to same to re-enter onto said polygonal mirror, the re-entered be projected again onto said polygonal mirror in such a manner that said light beam may move along the rotational direction of said polygonal mirror, the light beam projected again onto said polygonal mirror by way of the reflection means being reflected at the polygonal mirror to form a second unidirectionally and repetitively moving light beam to scan the object;
d. a converging optical system disposed in the light path between said light source and said polygonal mirror to converge the light beam from said light source onto the reflection surfaces of said polygonal mirror; and
e. a collimating optical system disposed in the light path for said first unidirectionally and repetititvely moving light beam to convert an angularly moving divergent light beam into a substantially parallel moving light beam.

18. The scanning optical system as claimed in claim 17, further comprising an image forming optical system for converging said second unidirectionally and repetitively moving light beam.

19. The scanning optical system as claimed in claim 18, wherein said image forming optical system is an $f\cdot\theta$ lens.

20. The scanning optical system as claimed in claim 17, wherein said second light beam moves angularly, and further comprising an optical system which converts the angularly moving second light beam into a substantially parallel moving light beam.

21. The scanning optical system as claimed in claim 17, wherein said second light beam comprises an angularly moving parallel beam, and further comprising an image forming optical system which converts the angularly moving parallel light beam into a substantially parallel moving converging light beam.

22. The scanning optical system as claimed in claim 21, wherein said image forming optical system is an $f \cdot \theta$ lens.

23. A scanning optical system for moving a light beam to cause it to scan an object, which comprises, in combination:
 a. a source of light for emitting a light beam;
 b. a polygonal mirror having a plurality of reflection surfaces optically disposed in confrontation to said light source for rotation in a predetermined direction, so as to cause each of the reflection surfaces to pass sequentially through first and second predetermined positions wherein said mirror forms a first unidirectionally and repetitively moving light beam by sequentially reflecting the light beam from said light source at each reflection surface which passes through said first position;
 c. reflection means optically disposed in confrontation to said polygonal mirror to cause said first unidirectionally and repetitively moving light beam to be projected onto the reflection surfaces of said polygonal mirror passing through said second position in such a manner that the light beam may move along the rotational direction of said polygonal mirror, the light beam thus projected again onto said polygonal mirror by means of the reflection means being converted into a second unidirectionally and repetitively moving light beam by being sequentially reflected at each reflection surface which passes through the second position; and
 d. beam diameter changing means disposed in the light path between said light source and the reflection surface which passes through said second position to cause the diameter of the light beam incident on the reflection surface which passes said first position to be smaller than the diameter of the light beam incident on the reflection surface which passes through said second position.

24. The scanning optical system as claimed in claim 23, wherein said beam diameter changing means includes a converging optical system disposed in the light path between said light source and the reflection surface which passes through said first position, and a collimating optical system disposed in the light path for said first unidirectionally and repetitively moving light beam.

25. The scanning optical system as claimed in claim 23, wherein said beam diameter changing means includes a converging optical system and a collimating optical system disposed in the light path for said first unidirectionally and repetitively moving light beam.

26. The scanning optical system as claimed in claim 25, wherein the light beam incident on the reflection surface which passes through said first position from said light source is a parallel light beam.

27. The scanning optical system as claimed in claim 35, further comprising an image forming optical system disposed to converge said second unidirectionally and repetitively moving light beam.

28. The scanning optical system as claimed in claim 27, wherein said image forming optical system is an $f \cdot \theta$ lens.

* * * * *

UNITED STATES PATENT AND TRADEMARK OFFICE
CERTIFICATE OF CORRECTION

PATENT NO. : 4,030,806
DATED : June 21, 1977
INVENTOR(S) : TAKESHI GOSHIMA, NORITAKA MOCHIZUKI It is certified that error appears in the above-identified patent and that said Letters Patent are hereby corrected as shown below:

Column 14, lines 39 and 40, delete "same to re-enter onto said polygonal mirror, the re-entered".

Column 16, line 29, delete "35" and insert --23--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*